United States Patent
Baldischweiler et al.

(10) Patent No.: US 8,504,105 B2
(45) Date of Patent: Aug. 6, 2013

(54) SIMULTANEOUS INTERFACE USE

(75) Inventors: Michael Baldischweiler, München (DE); Karl Eglof Hartel, München (DE)

(73) Assignee: Giesecke & Devrient GmbH, Munich (DE)

( * ) Notice: Subject to any disclaimer, the term of this patent is extended or adjusted under 35 U.S.C. 154(b) by 1129 days.

(21) Appl. No.: 12/299,701

(22) PCT Filed: May 4, 2007

(86) PCT No.: PCT/EP2007/003970
§ 371 (c)(1),
(2), (4) Date: Nov. 5, 2008

(87) PCT Pub. No.: WO2007/128529
PCT Pub. Date: Nov. 15, 2007

(65) Prior Publication Data
US 2009/0137276 A1    May 28, 2009

(30) Foreign Application Priority Data
May 5, 2006 (DE) .................. 10 2006 021 087

(51) Int. Cl.
*H04M 1/00* (2006.01)
(52) U.S. Cl.
USPC .................. 455/558; 455/41.1; 455/41.2
(58) Field of Classification Search
USPC ..................... 455/41.1, 41.2, 558
See application file for complete search history.

(56) References Cited

U.S. PATENT DOCUMENTS

| | | | |
|---|---|---|---|
| 4,939,353 A | 7/1990 | Iijima | |
| 5,206,495 A | 4/1993 | Kreft | |
| 5,999,713 A | 12/1999 | Reiner et al. | |
| 6,045,043 A | 4/2000 | Bashan et al. | |
| 6,105,874 A | 8/2000 | Berger et al. | |
| 6,615,390 B1* | 9/2003 | Takagi ..................... | 716/52 |
| 7,789,313 B2* | 9/2010 | Degauque et al. ......... | 235/492 |

(Continued)

FOREIGN PATENT DOCUMENTS

| | | |
|---|---|---|
| DE | 38 01 699 A1 | 8/1988 |
| DE | 39 35 364 C1 | 8/1990 |

(Continued)

OTHER PUBLICATIONS

ISO/IEC 14443-4 International Standard, Identification Cards—Contactless integrated circuit(s) cards—Proximity cards, Part 4: Transmission Protocol, First Edition Feb. 1, 2001.*

(Continued)

*Primary Examiner* — Amancio Gonzalez
(74) *Attorney, Agent, or Firm* — Bacon & Thomas, PLLC

(57) ABSTRACT

In a portable data carrier (1) having a contact-type interface device (2, 3) and a contactless interface device (4, 5) a sequencing device (6) coordinates competingly occurring contact-type and contactless data communications (16, 19) in such a way that the two data communications (16, 19) can be carried out sequentially step-by-step and without data loss. The processing of the first data communication via the first interface (4) is interrupted in order to start a second data communication via the second interface (2). After the step of starting, the interrupted processing of the first data communication is continued while at the same time the started second data communication is maintained.

18 Claims, 4 Drawing Sheets

U.S. PATENT DOCUMENTS

| | | | |
|---|---|---|---|
| 2004/0015594 A1* | 1/2004 | Guterman et al. | 709/229 |
| 2005/0191968 A1* | 9/2005 | Tabayashi et al. | 455/74 |
| 2005/0223143 A1 | 10/2005 | Kang et al. | |
| 2006/0186211 A1* | 8/2006 | Kim et al. | 235/492 |
| 2007/0243901 A1 | 10/2007 | Cho | |

FOREIGN PATENT DOCUMENTS

| | | |
|---|---|---|
| DE | 195 31 372 A1 | 2/1997 |
| DE | 198 00 798 A1 | 7/1999 |
| DE | 10 2004 043 408 A1 | 4/2005 |
| EP | 1 1100 045 A1 | 5/2001 |
| WO | WO 99/49415 | 9/1999 |

OTHER PUBLICATIONS

Search Report of German Patent and Trademark Office related to German Patent Application No. 10 2006 021 087.5, Mar. 14, 2007.

* cited by examiner

SIMULTANEOUS INTERFACE USE

BACKGROUND

A. Field

The present invention relates to a method for the simultaneous operation of two interfaces of a portable data carrier as well as such a data carrier, in particular a chip card, a secure multimedia card, a mobile radio card or the like.

B. Technological Background

Present developments in the field of portable data carriers, such as e.g. chip cards and the like, for more flexible application possibilities use a plurality of physically independent interfaces. In particular, portable data carriers can be provided with a conventional contact-type interface as well as an additional contactless interface, e.g. an antenna device for a radio link. The actual data communication then is carried out with the help of respective contact-type communications protocols (in the field of chip cards and mobile radio communications e.g. T=0, T=1) and/or contactless communications protocols (e.g. T=CL) with an external communication unit, with which the data carrier is in a communication connection.

Both, the operating systems and control systems available for portable data carriers having a contact-type and a contactless interface and the data communication modes presently supported by the multiple read/write units and communication units, however, exclusively admit only one data communication at a time either via the contact-type or via the contactless interface. But this is disadvantageous in situations, in which during a data communication via one of the two interfaces, via the other interface there starts a further data communication, which is not repeatable at a later point in time. Such a scenario is given with a portable data carrier formed as a mobile radio card, for example, when via the contact-type interface there is made a mobile phone call and meanwhile via the contactless interface a payment transaction, e.g. in public transport, is to be handled. For other types of portable data carriers other scenarios are thinkable respectively.

An obvious solution of this problem is to install a real-time multitasking operating system on the portable data carrier, in order to realize a simultaneous data communication via the two interfaces as concurrent, virtually parallel processes. At present, however, this solution is not realistic in view of the limited resources of portable data carriers and in many cases also not required for the normal use of such data carriers.

U.S. Pat. No. 6,105,874 discloses a portable data carrier with a contact-type and a contactless interface, which switches between the two interfaces with the help of an OR logic. But when the two interfaces are active at the same time the OR operation leads to data losses. U.S. Pat. No. 6,045,043 discloses a double interface apparatus, with which a contactless data communication is started, as soon as a magnetic field is present at the contactless interface, independent of the respective state of the contact-type interface. Such preferential treatment of the contactless interface, however, leads to disadvantages with respect to the stability of contact-type data communications.

Therefore, it is an object of the present invention, that a contact-type and a contactless interface of a portable data carrier can be simultaneously and reliably operated.

SUMMARY

This problem is solved according to the invention by a method and an apparatus having the features of the independent claims. The dependent claims describe advantageous embodiments and developments of the invention.

In the following one starts out from the situation that with a portable data carrier, which is provided with a first interface device comprising a first interface and a second interface device comprising a second interface as well as with a processor, and that the first interface device carries out a data communication via the first interface, meanwhile a data communication is started via the second interface by the second interface device. Then a sequencing device of the data carrier sequences the competing data communications by interrupting the first data communication and starting the second data communication or by delaying the start of the second data communication. In this way the second data communication which starts during the first data communication can be processed virtually simultaneous to the first, without there occurring a data conflict or that one of the two data communications remains entirely disregarded because of a preferred treatment of the respective other data communication.

The sequencing device coordinates the operation of the interface devices and that of the pertinent interfaces respectively in such a way that a sequential processing of simultaneous data communications is permitted. For this purpose the sequencing device sends a respective signal to the first interface device in order to signal to it that the first data communication carried out at that moment is to be interrupted, and a further signal to the second interface device in order to signal that the second data communication is to be started. Alternatively, the sequencing device sends a signal to the second interface device in order to signal that the second data communication is to be delayed, while the first interface device can continue the first data communication in an uninfluenced fashion.

In case the first interface device is a contactless interface device with a contactless interface and the second interface device is a contact-type interface device with a contact-type interface, there results the situation, that during a running contactless data communication via the contactless interface a contact-type data communication via the contact-type interface is added. In this case in a first embodiment of the invention, after the running contactless data communication has been interrupted, the contact-type data communication is started and entirely completed) and subsequently the interrupted contactless data communication is continued. This is coordinated by the sequencing device sending respective signals to the contactless and the contact-type interface device. Here within the framework of the contact-type data communication an incoming block of messages or data is completely received by the contact-type interface device and stored in a FIFO (first in-first out) or other memory of the data carrier. This storage operation can be realized, for example, by a direct memory access (DMA) or in an interrupt-driven fashion. Such a block of messages or data to be completely stored in particular can be an instruction, which is sent by an external communication unit being in contact with the data carrier via the contact-type interface, e.g. by a command APDU (C-APDU; Application Protocol Data Unit) when using the T=1 communications protocol.

Within the framework of the contact-type data communication, in response to the incoming instruction, e.g. of a command APDU, a response, e.g. a respective response APDU (R-APDU) caused by the sequencing device, is sent via the contact-type interface to the external communication unit. For this within the framework of the T=1 protocol a given response time (BWT; Block Waiting Time) between the incoming instruction and the sending of the respective response is provided, the data communication being aborted by the external communication unit when it does not receive any incoming response within the response time BWT. To avoid such a consequence after the end of the response time BWT, the sequencing device can give instructions to the contact-type interface device with the help of a respective signal as to direct an extension inquiry (WTX; Waiting Time Extension) to the external communication unit waiting, in order to extend the processing time for generating and sending the response required by the contact-type interface device.

In a second embodiment of the present invention the start of the contact-type data communication is delayed until the already running contactless data communication is entirely completed. The delay of the start of the contact-type data communication is caused by the sequencing device with the help of a respective signal to the contact-type interface device. Thereupon, the contact-type interface device delays the contact-type data communication by ignoring a data input at the contact-type interface, by incoming data not being further processed. By ignoring/not processing the data incoming at the contact-type interface, however, an asynchronous input buffer (UART; Universal Asynchronous Receiver Transmitter) disposed immediately downstream of the contact-type interface can overflow, since the incoming data exceed the (normally low) storage capacity of the UART buffer storage.

This, however, is recognized after the completion of the contactless data communication by the sequencing device with the help of the state of the UART storage, so that a contact-type data communication started while the contactless data communication was carried out can be subsequently recognized. On the basis of the incorrect contact-type data communication determined in this way, the contact-type interface device is given instructions by a respective signal of the sequencing device as to send an error message to the external communication unit, so that it repeats the contact-type data communication. Then the contact-type data communication can be completely and undisturbed received by the contact-type interface device.

The two above-mentioned embodiments are particularly suitable for chip cards and the like, the contact-type interface device of which works according to the block-based T=1 communications protocol. In contrast to this, the following third embodiment can preferably be used within the framework of the T=0 communications protocol by the contact-type interface device of a chip card. In the third embodiment the contactless data communication is interrupted when the contact-type data communication is started, and only the header of an instruction (C-APDU) received within the framework of the contact-type data communication is received, which must not be lost in a contact-type data communication within the framework of the T=0 protocol. In an incoming instruction in the form of a command APDU the header in the T=0 protocol consists of five bytes, which, caused by the sequencing device, are temporarily stored in a FIFO buffer (first-in first-out) or any other memory or memory area of the data carrier in particular by a direct memory access (DMA) or in an interrupt-driven fashion.

After the receipt of the header the sequencing device again switches over to the temporarily deactivated contactless interface device, in order to continue the interrupted contactless data communication. After the completion of the continued contactless data communication, the contact-type data communication is continued by the contact-type interface device and finally completed. When interrupting the contact-type data communication after the receipt of the header, a predetermined interruption time (WWT, Work Waiting Time), which indicates the maximum duration of an interruption of the contact-type data communication, has to be observed. If the contactless data communication cannot be continued within this interruption time WWT, the interruption time WWT will be extended until the contactless data communication can be completed and the interrupted contact-type data communication can be continued. Interrupting, switching and continuing the data communications is coordinated by the sequencing device, which also monitors and, if necessary, extends the predetermined interruption time WWT of the contact-type data communication.

While the three above-described embodiments are applicable, when a contact-type data communication starts during a running contactless data communication, in the following there are described two further embodiments for the opposite case, namely that a contactless data communication starts during a running contact-type data communication. In principle, the two following embodiments can be combined in any desired way with the three above-described embodiments.

In the fourth embodiment the running contact-type data communication is interrupted by a waiting phase caused by the sequencing device, during which the sequencing device activates the contactless interface device. During this waiting phase, which preferably is arranged directly after the receipt of an instruction (e.g. a C-APDU) by the contact-type interface device and before the sending of a respective response (e.g. a R-APDU), the contactless interface device is ready-to-receive. If during the waiting phase a contactless data communication is not started, the contact-type interface device will be re-activated, which then can continue the contact-type data communication interrupted before. If, however, during the waiting phase a contactless data communication starts, such communication is completed by the contactless interface device, even when this exceeds the originally arranged waiting phase. In this case, the waiting phase is extended, caused by the sequencing device, until the contactless data communication is entirely completed.

The waiting phase is realized by the contact-type interface device as a proactive phase) i.e. with the help of proactive commands, which reverse the master-slave relation between the external communication unit and the data carrier compulsory with the T=0 and T=1 protocol, so that an instruction can be given by the data carrier, which is answered by the external communication unit. With the help of such proactive commands of the data carrier, from the external communication unit there can be requested, in principle, waiting-phases of any length to be used for other purposes during a contact-type data communication. This is possible in particular with the help of the FETCH command and the TERMINAL RESPONSE command, with the help of which an external communication unit can be caused to first fetch an instruction (e.g. the request for the waiting phase) at the data carrier and subsequently send a response to the instruction to the data carrier. With the help of such proactive commands in the case of a starting contactless data communication the waiting phase can be extended, caused by the sequencing device, until the contactless data communication is entirely completed. Since the mechanism of the proactive commands is provided within both the framework of the T=0 and of the T=1 protocol, this fourth embodiment can be realized with the two protocols.

With a fifth embodiment of the present invention the contactless interface is locked/deactivated by the sequencing device until the already running contact-type data communication via the contact-type interface device is completed, i.e. an instruction (C-APDU) was received and a respective response (R-APDU) was sent. Here there is made use of the fact, that an external radio communication unit, which wants to establish a contactless data communication with the data carrier via the contactless interface device of the data carrier, recognizes by repeated polling when the contactless interface is unlocked/activated, in order to then start the contactless data communication. This embodiment is preferably used with the T=0 protocol, but can also be implemented in the T=1 protocol.

DESCRIPTION OF THE DRAWINGS

Further features and advantages of the invention appear from the following description of various embodiments and alternative embodiments according to the invention in connection with the accompanying Figures.

DETAILED DESCRIPTION OF PREFERRED EMBODIMENTS OF THE INVENTION

Figure 1:
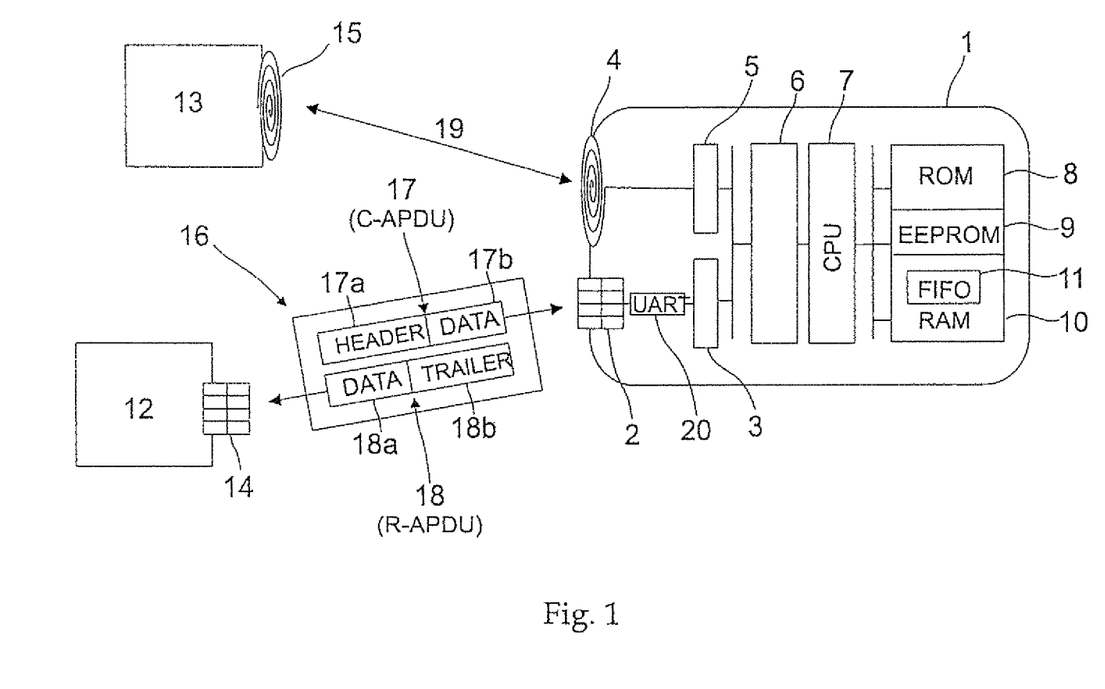
FIG. 1 shows a schematic representation of a chip card having a contact-type and a contactless interface.

FIG. 1 schematically shows a portable data carrier having the form of a chip card 1 with a processor 7 (CPU) and a three-stage memory array consisting of a permanent ROM memory 8, in which is located the operating system of the chip card 1, a rewritable EEPROM memory 9 and a volatile RAM main memory 10. In addition, chip card 1 comprises a contact-type interface device 2, 3, which comprises a conventional six-field or eight-field contact surface according to ISO 7816 as a physical interface 2 and a respective interface control 3. Moreover, chip card 1 comprises a contactless interface device 4, 5 with a contactless interface 4, which can be formed as an antenna or the like, and a respective interface control 5.

The contactless data and energy transmission to/from the chip card 1 can be realized in manifold ways, in particular as a conventional radio or RFID connection. The respective interface controls 3, 5 control the operation of the pertinent interfaces 2, 4 according to given standardized communication protocols. The contact-type interface 2 can be operated, for example, according to the communications protocols T=0 or T=1 usual in chip card and mobile radio communications, while the contactless interface 4, for example, is operated according to the T=CL protocol. The two interface controls 3, 5 in principle work independently of each other and process only the one data communication 16, 19, which is handled via the respective interface 2, 4.

In case of simultaneous data communications 16, 19 at two interfaces 2, 4 a coordinating sequencing is effected by a sequencing device 6, which is located downstream of the two interface devices 2, 3 and 4, 5. Sequencing device 6 sequences the handlings of the two competing data communications 16, 19, which in principle ought to be carried out in parallel by the respective interface devices 2, 3 and 4, 5, in such a way that at any time processor 7 processes only one of the two data communications 16, 19 and despite of this a data loss does not happen. For sequencing there is required a communication, coordinated by the sequencing device 6, with the respective external (radio) communication units 12, 13, which are in the simultaneous data communications 16, 19 with chip card 1. Both interface controls 3, 5 of interfaces 2, 4 and sequencing device 6 can be designed as hardware elements of chip card 1 or as software components, which either are stored as applications in EEPROM memory 9 or as components of the operating system in ROM memory 8. If they are executed by processor 7 of chip card 1, respective processes will be formed and processed.

Chip card 1 in principle can be any chip card provided with a processor, for example a smart card, a secure multimedia card or a mobile radio card, such as e.g. a GSM mobile radio card. In the last-mentioned case the GSM mobile radio card communicates via the contact-type interface 2 with a telecommunication terminal/mobile phone, in which the GSM mobile radio card is inserted, while via the contactless interface 4 there can be carried out a contactless data communication with an external radio communication unit, for example a vending terminal or the like equipped appropriately. In case of a contact-type communication 16 communication data 17, 18 are exchanged between the contact-type interface 2 of chip card 1 and a respective contact-type interface 14 of an external communication unit 12. Likewise, in case of a contactless data communication 19 communication data are exchanged between contactless interface 4 and a respective contactless interface 15 of a radio communication unit 13.

When using the T=0 or T=1 protocol, contact-type data communication 16 of the chip card 1 is carried out in the master-slave operation mode with the external communication unit 14, e.g. a mobile phone, as an active communication partner (master) and the chip card 1 as reactive communication partner (slave), which merely reacts to the instructions of the external communication unit 14. For this reason, in the following it can be assumed, that a contact-type data communication 16 comprises an instruction 17 of external communication unit 14 to chip card 1 and a subsequent response 18 of chip card 1 to communication unit 14. In this connection instructions and answers, preferably, have an ISO-7816-conform structure independent of the protocol. Instruction 17 preferably has the form of a command APDU (C-APDU) and response 18 has the form of a response APDU (R-APDU). Both, a C-APDU 17 and a R-APDU 18 correspond to a standardized data format and comprise both the actual payload data and supplementary control data. A C-APDU 17 consists of leading header data 17a (header) and following payload data 17b, while an R-APDU 18 consists of leading payload data 18a and following trailer data 18b (trailer).

Within the scope of the present invention only those technical features of chip cards, chip card protocols and data formats are explained, which are immediately necessary for understanding the invention.

When in the following the terms interrupting or resuming a data communication are used, there is meant interrupting or resuming the processing of the communication by the SIM card 1 in particular by its CPU 7. Detailed and supplementary technical connections are described in "Handbook of the chip cards, 4th ed." by W. Rankl and W. Effing.

Figure 2:
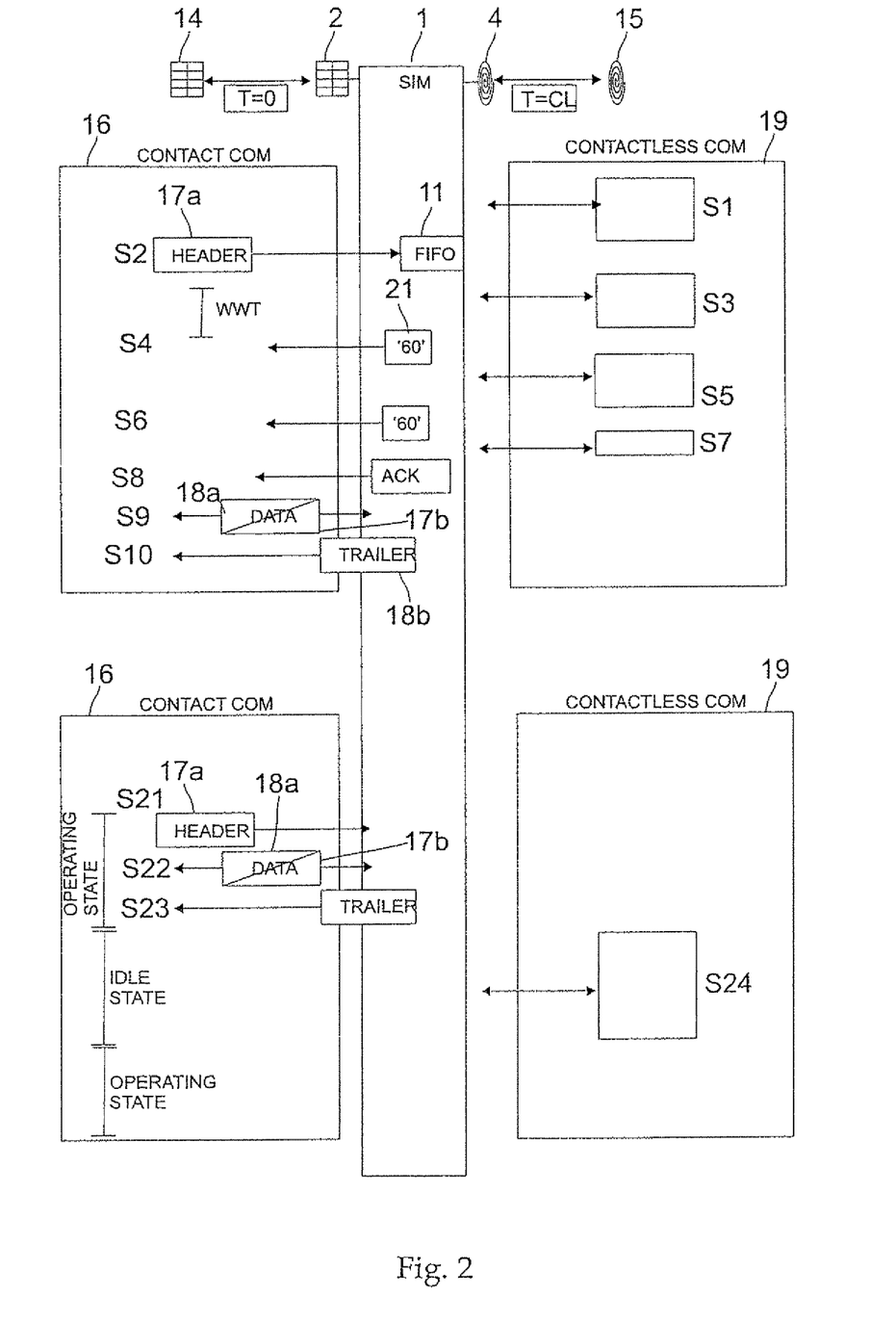
FIG. 2 shows a flow chart of a sequencing process in the T=0 protocol.

FIG. 2 schematically shows the simultaneous processing of a contact-type data communication 16 (CONTACT COM; FIG. 2, on the left) via the contact-type interface device 2, 3 sequenced by the sequencing device 6 of a SIM mobile radio card 1 as a preferred implementation of a portable data carrier according to the invention, and a contactless data communication 19 (CONTACTLESS COM; FIG. 2, on the right) via the contactless interface device 4, 5. Here the steps S1 to S10 (FIG. 2, at the top) constitute the sequencing of a contact-type data communication 16, which starts during an already running contactless data communication 19, while with the steps S21 to S24 (FIG. 2, at the bottom) a simple sequencing of a contactless data communication 19 is realized, which starts while a contact-type data communication 16 is already running.

With a contact-type data communication 16 within the framework of the T=0 protocol the header data 17a (HEADER) comprising 5 bytes of a received C-APDU 17 should not be lost. For this reason at least the processing of a running contactless data communication (step S1) is interrupted when a contact-type data communication 16 is started. The header data 17a sent by an external communication unit 12 are completely received (step S2) and temporarily stored by the sequencing device 6 e.g. in a FIFO memory 11, which preferably is arranged in the RAM memory 10 of SIM card 1. Likewise, header data 17a can be written into a memory or memory area of SIM card 1 provided therefor, e.g. in the RAM main memory 10, per direct memory access (DMA) or via an interrupt.

After the header data 17a have been completely received the sequencing device 6 again switches over to the contactless data communication 19, which then is at least carried out further (step S3) or entirely completed.

An interruption time WWT (Work Waiting Time) at the contact-type interface 2, which indicates the maximum time period between the starting edges of two received bytes following each other before the abortion of the data reception, is monitored either by the sequencing device 6 or the interface control 3. SIM card 1 sends an extension inquiry 21 (shortly) before the end of the WWT, for example in the form of a so-called zero byte: '60' as a procedure byte, via the contact-type interface 2 to the external communication unit 14 (step S4). For this purpose the contactless data communication 19 continued in step S3, if required, is interrupted again and not continued until after that (step S5).

There can follow multiple steps of sending extension inquiries (S6) respectively via the contact-type interface 2, in order to maintain the contact-type data communication 16 until the contactless data communication 19 is completed (step S7). In this way, acknowledging the complete receipt of the header data 17a of an incoming C-APDU by the interface unit 3 with the help of an acknowledge ACK as a procedure byte (step S8) is delayed until after the completion of the contactless data communication 19.

Subsequently, the contact-type data communication 16 interrupted on receipt of the header data 17a (step S2) is continued according to the protocol, by in step S9 taking place the exchange of payload data (DATA), i.e. that on the one hand the payload data 17b of the command APDU 17 are transmitted to the SIM card 1 and on the other hand the payload data 18a of the response APDU 18 are transmitted to the external communication unit 12. Finally, the trailer data 18b (TRAILER) of the response APDU 18 are transmitted to the external communication unit 14 (step S14). These trailer data 18b for example comprise the return codices SW1 and SW2 (return code) of the response APDU 18.

When the contactless data communication 19, however, is already completed with step S3, the interrupted receipt of the instruction 17 via the contact-type interface 2 is continued with the steps of sending S8 the acknowledgement ACK, the data exchange S9 and transmitting S10 the trailer data 11b.

The opposite case that during a contact-type data communication 16 a contactless data communication 19 starts, can be sequenced within the framework of the T=0 protocol.

In a first variant, not separately shown in a Figure, the processing of the contact-type data communication 16 at first is interrupted and subsequently is maintained with the help of extension inquiries 21, in order to be able to process the contactless data communication 19 virtually parallel. The method basically runs analogous to the steps S2 to S10 described above in FIG. 1, only step S1 is to be mentally deleted. After the receipt of header data 17a as a first procedure step, the running contact-type data communication 16 is interrupted by a newly started contactless data communication 19. A WWT is monitored for the contact-type data communication 16 and, if required, extended once or multiple times by an extension inquiry 21, until the contactless data communication 19 is completed. Thereafter, the interrupted contact-type data communication 16 can be continued.

In a second variant, which is shown in the bottom half of FIG. 2, at first there is carried out the contact-type data communication 16 in an operating state (OPERATING STATE), in which at the same time the contactless interface 4 is locked by the sequencing device 6, by sending header data 17a of a command APDU 17 (step S21), exchanging payload data 17b, 18a (step S22) and sending trailer data 18b of a response APDU (step S23). The contactless data communication 19 is blocked or delayed during the operating state of the contact-type interface device 2, 3. This means, that during the operating state of the contact-type interface device 2, 3 interrupts, which are produced at the contactless interface device 4, 5 by reason of a starting contactless data communication 19, e.g. because the contactless interface 4 entries the magnetic field of a radio communication unit 13, are ignored and not processed.

Since the radio communication unit 13 carries out a polling for a certain period, when the contactless interface unit 4, 5 is locked, i.e. repeatedly tries to make contact, the start of the contactless data communication 19 can be delayed until the completion of the operating state. After sending the trailer data 18b to the external communication unit 12 the sequencing device 6 converts the contact-type interface device 2, 3 from the operating state into an inoperative state (IDLE STATE), in which at the same time the contactless interface unit 4, 5 is released, so that upon the application of a respective magnetic field at the contactless interface 4 (or with the receipt of an RIQx signal from the external radio communication unit 13) the contactless data communication 19 can be started and carried out in step S24. After the completion of the contactless data communication 19, the operating state of the contact-type interface device 2, 3 is switched on by the sequencing device 6 and there can take place a further contact-type data communication 16.

With the sequencing methods complementing each other that are described with respect to FIG. 2 an alternating and lossless processing of the competing data communications 16, 19 via interfaces 2, 4 of SIM card 1 and with that a simple multitasking for the T=0 protocol is realized.

Figure 3:
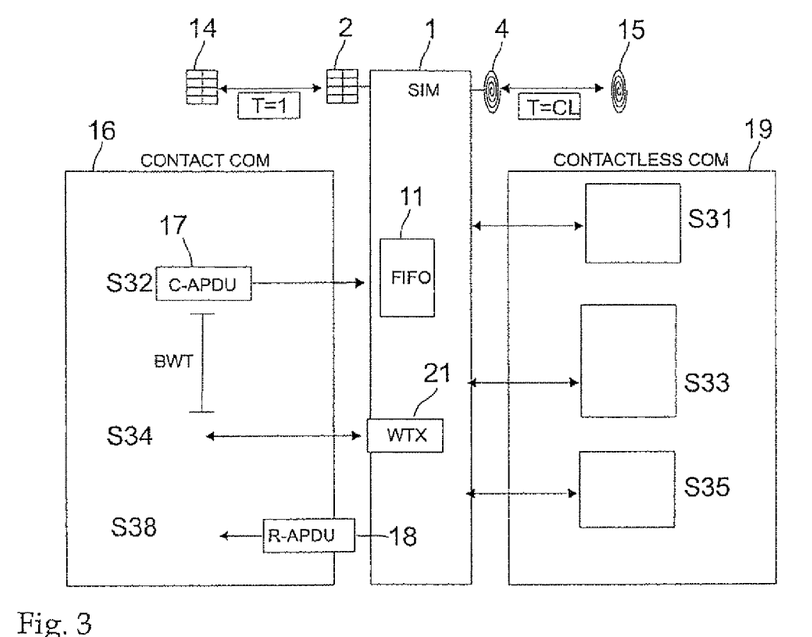
FIG. 3 shows a flow chart of a first variant of a sequencing process in the T=1 protocol.
Figure 4:
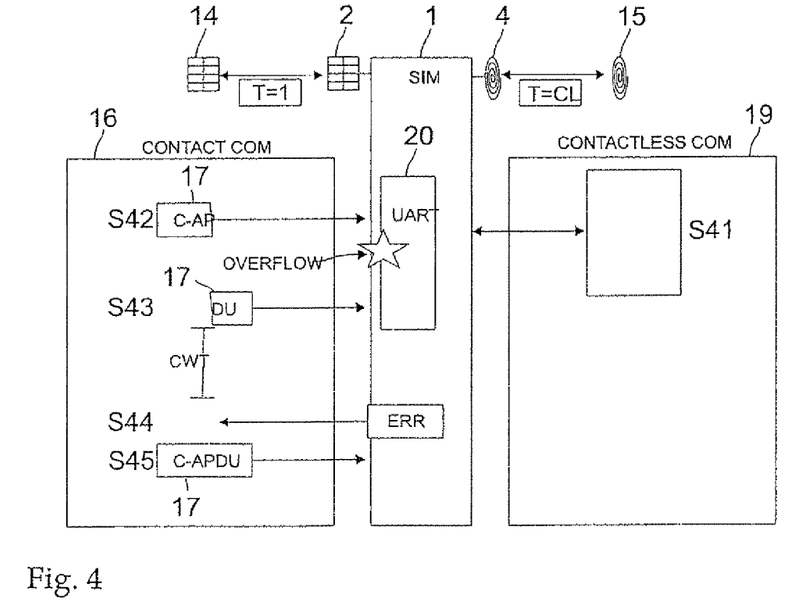
FIG. 4 shows a flow chart of a second variant of a sequencing process in the T=1 protocol.

In a similar way FIGS. 3 and 4 show two alternative sequencing methods for a contact-type data communication 16 according to the T=1 protocol, which starts during a contactless data communication 19. The opposite case of a contactless data communication 19 starting during a contact-type data communication 16 can be realized in the T=1 protocol in principle analogous to the T=0 protocol, i.e. either as shown in the lower half of FIG. 2 or as a method which starts with step 32 of FIG. 3.

Both FIG. 3 and FIG. 4 show the case of a contact-type data communication 16 starting during a contactless data communication 19. In the T=1 protocol the receipt of header data 17a and payload data 17b of an instruction 17 (C-APDU) cannot be interrupted as with the T=0 protocol (cf. FIG. 2, above). Therefore, for the T=1 data communication 16 two alternatives are expedient, which are realized by steps S31 to S38 (FIG. 3) and S41 to S45 (FIG. 4).

With the embodiment shown in FIG. 3 a contactless data communication 19 started in step S31 is interrupted with the start of the contact-type data communication 16 by the sequencing device 6, so as to first start the contact-type data communication 16. For this purpose in step S32 the C-APDU 17 is received via contact-type interface 2 and temporarily stored in a FIFO memory 11. Alternatively, data 17a, 17b of incoming instruction 17 can also be stored with the help of a direct memory access (DMA) or in an interrupt-driven fashion with priority in any suitable memory or memory area of SIM card 1. Thereafter, the contact-type data communication 16 again is interrupted in favor of the continuation of the contactless data communication 19 (step S33).

The predetermined response time (BWT, Block Waiting Time) for generating and sending a response 18 (R-APDU) to the received instruction 17 is monitored in SIM card 1. In good time before the end of the BWT SIM card 1 sends in a step S34 an extension inquiry 21 in the form of a waiting time extension inquiry (WTX Request) and receives a respective acknowledgement (Waiting Time Extension Acknowledge—WTX Ack). Requesting an extension of the waiting period can be effected, if required, several times, until the contactless data communication 19 is completed (step S35). Requesting S34 the extension can be effected in a fashion controlled by CPU 7 of SIM card 1 or by contact-type interface device 2, 3. Thereafter, SIM card 1 continues the processing of the contact-type data communication 16 (step S38). In particular, the steps connected with the received command 17 are executed and a respective R-APDU 18 is sent via the contact-type interface device 2, 3 to the external communication unit 12.

Moreover, the response time BWT should be adjusted respectively already in the initialization phase (ATR; Answer to reset) of the contact-type data communication 16 arranged upstream of the described method. The BWT is negotiated between SIM card 1 and external communication unit 12 such that it has a value as high as possible.

In the case of a running contact-type data communication 16 and a then starting contactless data communication 19, in the T=1 protocol, too, the contact-type data communication 16 can be interrupted and as long as necessary maintained by respective extension inquiries 21 until the contactless data communication 19 is completed. This solution can also be recognized in FIG. 3, when step S33 is regarded as the start of the contactless data communication and step S31 is imagined not to be there or is allocated to the completion of a previous contactless data communication.

Before an interruption of the processing of a data communication in favor of the processing of a different data communication it is checked, whether it is permitted at all that the data communication is interrupted. For example, it can be defined that it is only permitted that the contact-type data communication is interrupted. Parameter for the sequencing stored on SIM card 1 can contain information as to which type of data communication is permitted to be interrupted. Furthermore, in the parameter to be checked can be differentiated whether it is permitted that the data communication is interrupted as an initial data communication in favor of a second data communication or as a second data communication in favor of an initial data communication. The parameter to be checked can be designed in a card-specific, application-specific and/or command-specific fashion. With that, for example, the provider of an application has the possibility to adapt the behavior of the SIM card to his security requirements without a change of the control software in the SIM card.

Moreover, there can be checked, whether an interruption of a data communication is necessary at all. When the remaining runtime expected for the processing of a data communication falls below a limit value, the data communication can be continued without an interruption being necessary. The remaining runtime can be calculated from a measured command runtime and an expected scheduled runtime for the command. The limit value as a parameter for the sequencing can also be designed in a card-specific, application-specific and/or command-specific fashion.

Checking the necessity and/or permissibility of the interruption as described, is an option applicable to all embodiments of the invention.

In an alternative embodiment for the T=1 protocol shown in FIG. 4, a running contactless data communication 19 (step S41) is not interrupted on the start of a competing contact-type data communication 16, but completed.

The competing contact-type data communication 16 here is not actively interrupted or completed, but merely not processed. I.e., that the data of a C-APDU 17 incoming at the contact-type interface 2 in step S42 reach into one of the asynchronous UART input buffer 20 arranged downstream of the contact-type interface 2, but these data are not read-out further with priority and processed as usual. The consequence is that the normally relatively small UART buffer 20 overflows already after a part of the incoming data (step S42) of the C-APDU 17 (OVERFLOW) and at least the remaining data incoming after the overflow are lost (step S43).

After the completion of the contactless data communication 19 the sequencing device 6 recognizes the overflow of the UART buffer 20 and thus that during the processing of the contactless data communication 19 a competing contact-type data communication 16 has taken place in step S23 and S24, which could not be completely received. If necessary, the sequencing device 6 has to let go the still remaining data of the C-APDU 17 in step S43 into the void. The end of the transmission of the C-APDU 17 is recognized by the sequencing device 6 from the expiring of the character waiting time (CWT), which defines the maximum time period between the starting edges of two consecutive characters within an incoming data block. Then the incorrect receipt of the C-APDU 17 in steps S18 and S19 is acknowledged with an error message (ERR) of the sequencing device 6 or the contact-type interface device 2, 3 to the external communication unit 12 in step S44, whereupon the external communication unit 12 again sends C-APDU 17, which then can be received properly and completely (step S45).

Figure 5:
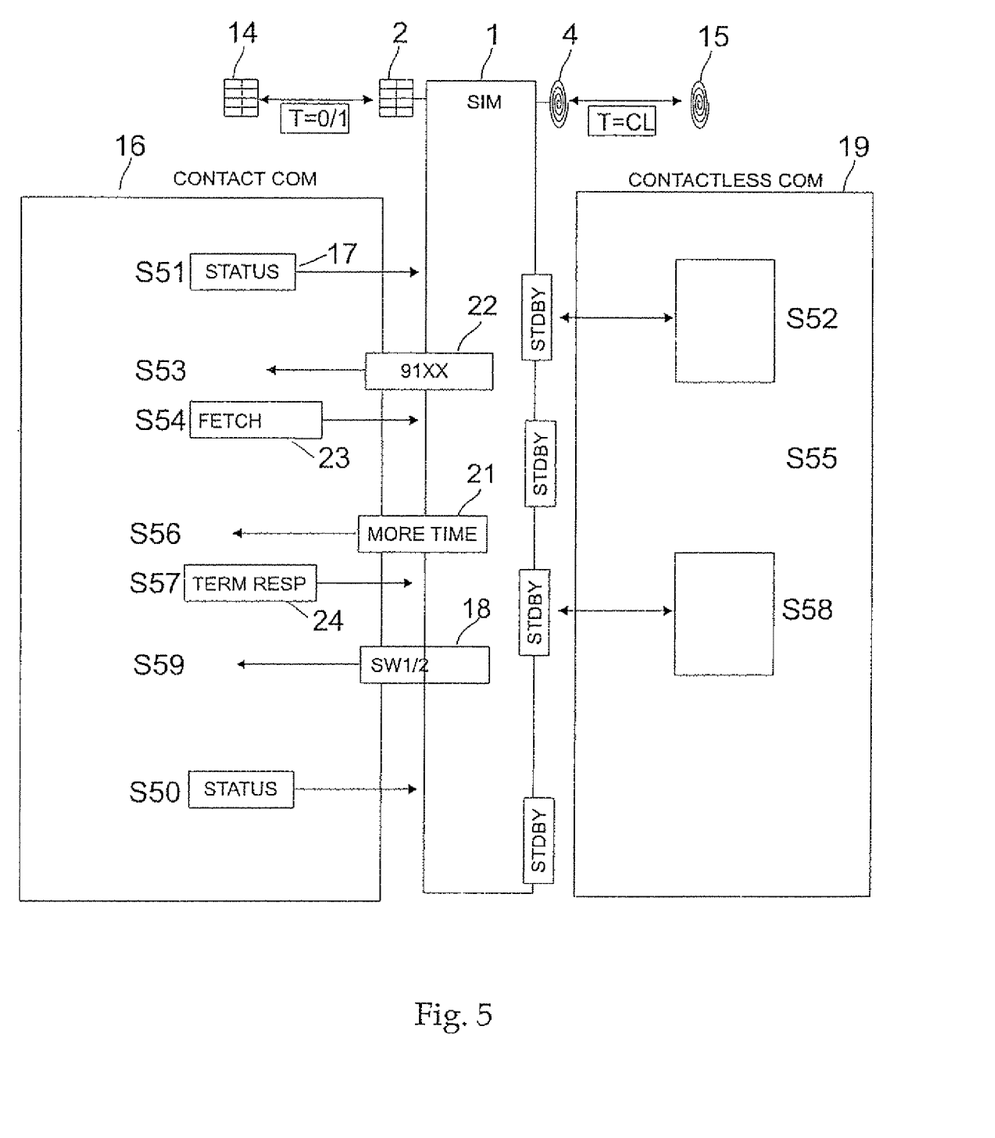
FIG. 5 shows a flow chart of an alternative sequencing process.

Finally, FIG. 5 with steps S51 to S59 shows a further embodiment of a sequencing of, in principle, competing data communications 16, 19, for the case that a contactless data communication 19 starts during an already running contact-type data communication 16. In contrast to the approaches shown above, the sequencing is not effected solely by the SIM card, but at least partially in cooperation with the external communication units 12.

For this purpose the running contact-type data communication 16 is temporarily interrupted by the sequencing device 6 at different points in time and a ready-to-receive state (STANDBY) of the contactless interface 4 is created, in order to be able to recognize and process any starting contactless data communications 19. For example, after the sending of a C-APDU 17 from the external communication unit 12 to the contact-type interface device 2, 3 in step S51 and before sending back a respective R-APDU 18 in step S53 a temporary ready-to-receive state of the contactless interface device 2, 3 can be arranged (step S52), in order to be able to process any contactless data communications 19 starting during this time period.

In SIM mobile radio cards 1 there is provided a special set of commands within the framework of the SIM application toolkit, which provides proactive commands to a mobile radio card 1, which avoid the conventional master-slave relation between a SIM mobile radio card 1 and a communication unit 12, 13 and allow the SIM card 1 to direct instructions to the communication unit 12, which have to be answered by the latter. For this purpose, in particular the commands STATUS, FETCH and TERMINAL. RESPONSE are suitable. With the help of the STATUS command the communication unit 12 requests, whether SIM card 1 wants to issue proactive commands. The card will answer with a status code "91XX", if it wants to send a command itself. By transmitting the FETCH command, the external communication unit 12 then fetches an instruction at SIM card 1 which it has to process, while with the help of the TERMINAL. RESPONSE command (TERM RESP) the respective response of the external communication unit 12 to the instruction fetched before is transferred to SIM card 1. By using the proactive commands of the SIM application toolkit, there can be selectively achieved, e.g. caused by the sequencing device 6, a ready-to-receive state (STANDBY) at the contactless interface 4 several times one after the other.

Response 22 in the form of status code "91XX" of SIM card 1 in step S53 causes the external communication unit 12 to fetch an instruction at SIM card 1 with a FETCH command 23 (step S54). SIM card 1 uses the processing time granted to it for a ready-to-receive state phase S55 of the contactless interface 4.

As an instruction to be fetched by the external communication unit 12 now, preferably, the MORE TIME instruction can be used, with which SIM card 1 requests further time from the external communication unit 12 for the processing of tasks. In the present case, by the step of sending S56 a MORE TIME inquiry 21, it requests the time for a further ready-to-receive-state phase (STDBY) for processing the contactless data communication 19. The MORE TIME instruction 21 of SIM card 1 is granted by external communication unit 12 with a TERMINAL RESPONSE command (step S57). If now in the further ready-to-receive-state phase a contactless data communication 19 starts (step S58), SIM card 1 can send further MORE TIME instructions. Preferably, the ready-to-receive state is extended in such a way until the completion of the contactless data communication 19. SIM card 1 can send in step S59, for example, a status code "9000" as a response 18 via the contact-type interface device 2, 3 to the communication unit 12.

During the proactive phase, before each sending S53, S56, S59 of a response, the sequencing device 6 can release/activate the contactless interface device 4, 5, in order to be able to recognize and process any contactless data communication 19. After the sending of the response, the contact-type interface device 2, 3 is re-activated.

With a step S50 of sending a further STATUS command then possibly starts a further data communication 16 between communication unit 12 and SIM card 1 via contact-type interface device 2, 3.

The time interval between the receipt of two STATUS commands or between the last response of SIM card 1 in a proactive phase and the next STATUS command should be chosen in a suitable way. Normally, the time interval is negotiated between SIM card 1 and communication unit 12 in an initialization phase of the contact-type communication 16. Communication unit 12 then sends STATUS commands in the agreed time interval. Because of the fast reaction time necessary for the contactless data communication 19, the time interval should be as small as possible.

From the viewpoint of communication unit 12, however, an as large as possible time interval would rather be expedient, for example) to save electricity or to avoid times in which the communication unit 12 waits for an instruction of SIM card 1. Therefore, the time interval should be arranged such that it can be (temporarily) shortened. As a trigger for the shortening, for example, an input of the user into the communication unit 12 can be used, with which the user requests a release/activation of the contactless communication interface 4, 5, preferably for a limited time period of for example one minute. But likewise, recognizing a contactless data communication field or recognizing an attempt to set up the contactless data communication can serve as a trigger, the contactless data communication, preferably, being recognized and communicated to communication unit 12 by SIM card 1, for example in the form of a status code of a response 18.

Then the user can activate the contactless interface device 4, 5 for a given time period, for example one minute, via the SIM application toolkit of the mobile radio card, so that during this time period the sequencing device 6 creates the ready-to-receive state of the contactless interface device 4, 5 via cycles of proactive commands. The sequencing device 6 or the contactless interface device 4, 5—optionally after an initialization of the contactless interface 4—waits a given time period (e.g. two seconds) for a contactless data communication 19 starting at the contactless interface 4. If within this time period a contactless data communication 19 starts, the sequencing device 6 ensures, that such communication can be completed.

Here it is advantageous, that immediately after a contactless data communication 19 a user dialogue via the contact-type interface 2 can be started. It is also possible that instead of the MORE TIME instruction different proactive commands are used, with which, additionally, a contactless data communication 19 starting at the contactless interface 4 is waited for. Instead of the above described proactive operating, there can also be sent one or a plurality of special APDUs from the external communication unit 12 to SIM card 1, which for a defined time period wait for a contactless data communication 19 at the contactless interface 4. Likewise, it is possible, that the external communication unit 12, which normally is a mobile radio terminal, operates a cyclic polling with suitable APDUs, so that the user of the mobile radio card 1 does not have to carry out a selection from the menu in the SIM application toolkit, in order to activate the contactless interface device 4, 5.

With the above-described embodiments there have to be taken into consideration, that the occurrence of a magnetic field at the contactless interface 4, preferably, doe not necessarily mean that a contactless data communication 19 is really effected. Therefore, it can be expedient to define the start of a contactless data communication 19 as the point in time at which SIM card 1 is selected by the external radio communication unit 13. Until this point in time, in particular the receipt and temporary storage of data within the framework of the contact-type data communication 16 by the contact-type interface device 2, 3 and an initialization and anticollision at the contactless interface 4 can run in parallel.

Likewise, a contactless data communication 19, which can also consist of a plurality of APDUs, preferably is "short", i.e. that in the case of two contact-type data communications 16 following each other it can be placed in between their APDUs. In this connection it can be expedient to monitor the length of a contactless data communication 19 and to optionally abort it, if it lasts too long. In case of longer contactless data communications 19 it can be expedient to alternately process the respective APDUs of the competing contact-type and contactless data communications 16, 19. For this purpose, however, a delay mechanism to be used at the contactless interface device 4, 5 is necessary. Since the protocol mechanisms of the contactless T=CL protocol are similar to those of the contact-type T=1 protocol, also with a contactless data communication 19 there can be used a monitoring or extension of the response time by WTX inquiries and/or the repeated sending/receiving of ignored and/or lost data blocks.

The invention claimed is:

1. A method in a portable data carrier having a first interface and a second interface for communicating with external communication units, comprising the following steps in the portable data carrier:
   interrupting a processing of a first data communication via the first interface;
   starting a second data communication via the second interface after the step of interrupting, wherein a processor of the portable data carrier processes only one of the two data communications at a time;
   after the step of starting the processing of the second data communication, effecting a continuation of the interrupted processing of the first data communication; and
   after the step of continuing the processing of the first data communication, maintaining the started second data communication by sending an extension inquiry via the second interface.

2. The method according to claim 1, wherein the continued processing of the first data communication is interrupted at least one time by maintaining the second data communication.

3. The method according to claim 1, wherein the step of starting the second data communication comprises a receiving of at least a first part of data to be received.

4. The method according to claim 3, wherein the step of starting the second data communication comprises temporarily storing at least a first part of the data to be received.

5. The method according to claim 1, wherein a completion of the maintained second data communication is effected after an ending of the first data communication.

6. The method according to claim 5, wherein the completion of the maintained second data communication comprises a receiving of a second part of the data to be received.

7. The method according to claim 5, wherein the completion of the maintained second data communication comprises a processing of the data to be received.

8. The method according to claim 3, wherein the received first part is an instruction.

9. The method according to claim 3, wherein the received first part is an instruction header.

10. The method according to claim 1, including a monitoring of a predetermined waiting period in the first data communication and extending the waiting period if the continued second data communication is not completed within the waiting period.

11. The method according to claim 1, wherein the first data communication is a contact-type data communication and the second data communication is a contactless data communication.

12. The method according to claim 1, wherein the first data communication is a contactless data communication and the second data communication is a contact-type data communication.

13. The method according to claim 11, wherein the contact-type data communication is carried out according to the T=0 protocol.

14. The method according to claim 11, wherein the contact-type data communication is carried out according to the T=1 protocol.

15. A portable data carrier, comprising;
    a processor;
    a first interface device comprising a first interface; and
    a second interface device comprising second interface;
    a sequencing device configured to sequence a first data communication carried out via the first interface and a second data communication starting in the meantime via the second interface, said sequencing device arranged to carry out the method recited in claim 1.

16. The portable data carrier according to claim 15, wherein the sequencing device is arranged to transmit signals to the first interface device to interrupt the first data communication, and signals to the second interface device to start the second data communication.

17. The data carrier according to claim 15, wherein the first interface device is a contactless interface device with a contactless interface for carrying out a contactless data communication and the second interface device is a contact-type interface device with a contact-type interface carrying out a contact-type data communication.

18. The data carrier according to claim 15, wherein the portable data carrier is a smart card, a secure multimedia card or a mobile radio card.

* * * * *